UNITED STATES PATENT OFFICE.

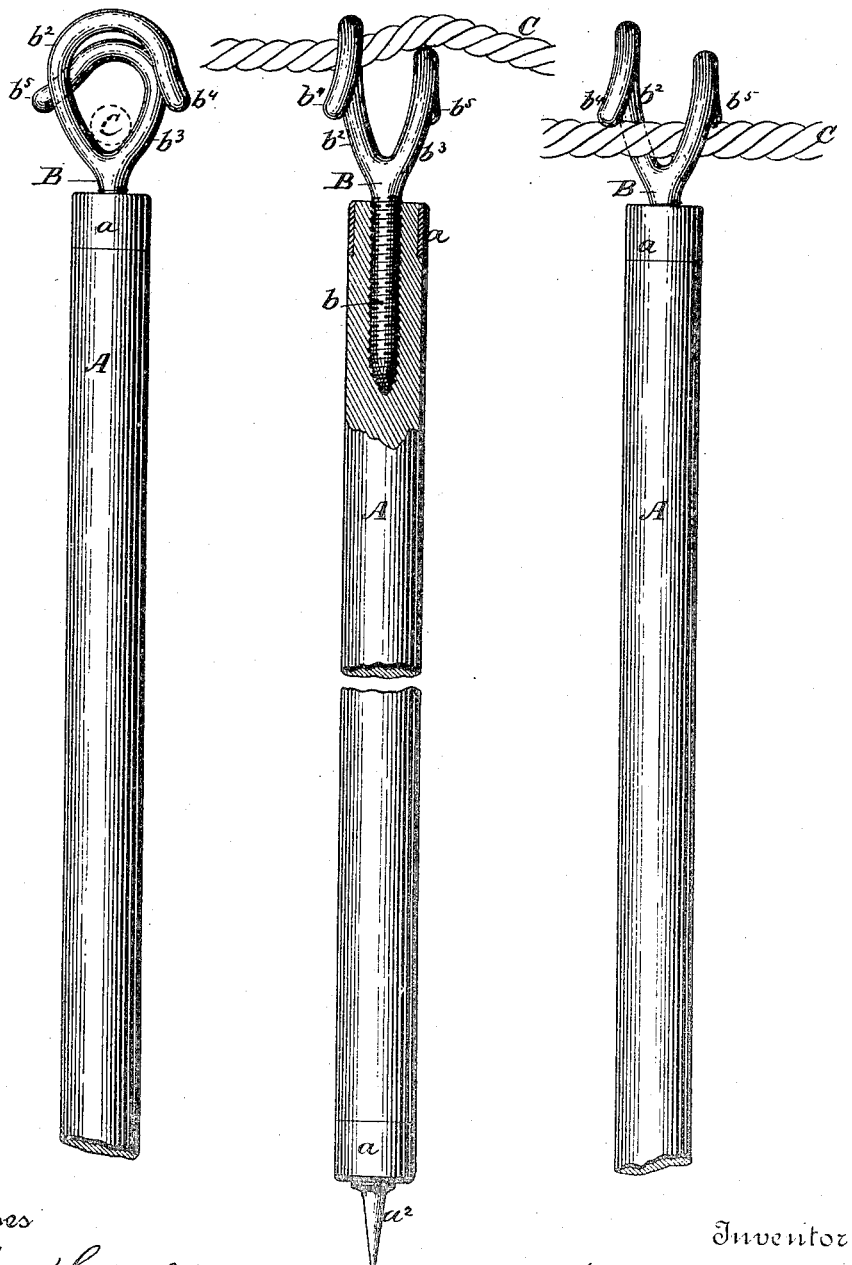

STAATS V. D. WACK, OF POINT PLEASANT, NEW JERSEY.

CLOTHES-LINE PROP.

SPECIFICATION forming part of Letters Patent No. 427,642, dated May 13, 1890.

Application filed March 12, 1890. Serial No. 343,623. (No model.)

*To all whom it may concern:*

Be it known that I, STAATS V. D. WACK, a citizen of the United States, residing at Point Pleasant, in the county of Ocean, State of New Jersey, have invented certain new and useful Improvements in Clothes-Line Props, of which the following is a specification, reference being had therein to the accompanying drawings.

My invention relates to devices for supporting clothes-lines in an elevated position; and the objects of my improvements are to produce a simple and inexpensive device to be inserted in the end of a pole or of a slat of suitable length, which device will be readily hooked upon a clothes-line and receive said line in an eye formed by the crotch and the two bent-over branches or hooks of different sizes. I attain these objects by the construction illustrated in the accompanying drawings, in which—

Figure 1 is a side view of a portion of a prop provided with a clothes-line-retaining device constructed in accordance with my invention. Fig. 2 is a front view of the same, partly in section, showing one of the branches of the line-retaining device in engagement with said line. Fig. 3 is also a front view of the same with the clothes-line in full engagement therewith.

In said drawings, A represents a pole of suitable thickness and length, preferably provided with a ferrule $a$ at each end. In the end which is intended to rest upon the ground there is inserted a pointed spur $a^2$ to prevent the prop from slipping upon the ground when in use. The clothes-line-retaining device B, preferably of galvanized iron, is inserted in the opposite end of the pole, and to retain it firmly therein its shank $b$ is preferably screw-threaded. Above said shank it is forked into two branches $b^2 b^3$, of unequal lengths, that are bent over in opposite directions to form semicircular hooks, the points $b^4 b^5$ of which extend beyond and in a plane tangent to the back of the companion hook, as shown in Fig. 1; and said points are also divergent laterally from the body of said hooks, as shown in Figs. 2 and 3. The space between the branches $b^2$ and $b^3$ is of a sufficient size to readily receive the clothes-line C.

The advantages obtained by this construction over the props having only the fork at the end thereof, or over those having an upper and lower lip to each hook, are the facility with which this device is made to engage with a clothes-line, even in the dark, or when the line is swaying in the wind, or is out of reach of a person's hands to steady it, as the upper end of this prop can be brought to bear against the side of the line and be drawn back until the hook $b^4$ is made to engage with it, as shown in Fig. 2. The prop is then given a quarter of a turn and slightly lifted at the same time to bring the line under both hooks, as shown in Figs. 1 and 3, and when supporting the line the latter rests upon the crotch of the fork between the branches $b^2 b^3$, and is prevented from leaving said position by the bent-over portions of said branches.

Having now fully described my invention, I claim—

A clothes-line prop consisting of a pole, a shank inserted therein and having two bent-over branches, forming two hooks of different sizes and facing in opposite directions, the points of each hook being divergent and extending beyond the plane of the back of the other hook, substantially as described.

In testimony whereof I affix my signature in presence of two witnesses.

STAATS V. D. WACK.

Witnesses:
C. A. PHARO,
H. H. ROBBINS.